(12) United States Patent
Weih et al.

(10) Patent No.: US 12,331,856 B1
(45) Date of Patent: Jun. 17, 2025

(54) SEALING GASKET WITH PLASTIC RETAINER RING FOR PLASTIC PIPELINE SYSTEMS HAVING PRE-FORMED SOCKETS

(71) Applicant: S & B Technical Products, Inc., Fort Worth, TX (US)

(72) Inventors: Mark A. Weih, San Jose (CR); Guido Quesada, Santa Ana (CR)

(73) Assignee: S&B Technical Products, Inc., Fort Worth, TX (US)

( * ) Notice: Subject to any disclaimer, the term of this patent is extended or adjusted under 35 U.S.C. 154(b) by 0 days.

(21) Appl. No.: 18/581,948

(22) Filed: Feb. 20, 2024

(51) Int. Cl.
*F16L 21/03* (2006.01)
*F16J 15/06* (2006.01)

(52) U.S. Cl.
CPC ............. *F16L 21/03* (2013.01); *F16J 15/067* (2013.01)

(58) Field of Classification Search
CPC ......... F16L 21/03; F16L 17/02; F16L 17/025; F16L 17/032; F16L 17/06; F16L 17/067; F16L 47/06; F16L 47/08; F16L 47/10; F16J 15/067
See application file for complete search history.

(56) References Cited

U.S. PATENT DOCUMENTS

| | | | |
|---|---|---|---|
| 4,030,872 A | 6/1977 | Parmann | |
| 4,379,599 A | 4/1983 | Bonham | |
| 4,666,165 A | 5/1987 | Nordin | |
| 6,044,539 A | 4/2000 | Guzowski | |
| 6,142,484 A | 11/2000 | Valls, Jr. | |
| 6,328,309 B1 | 12/2001 | Corbett, Jr. | |
| 10,107,427 B2 | 10/2018 | Monteil | |
| 10,596,751 B1 | 3/2020 | Copeland | |
| 2020/0292109 A1* | 9/2020 | Quesada | F16L 21/03 |
| 2021/0080042 A1 | 3/2021 | Pacheco et al. | |

* cited by examiner

*Primary Examiner* — Aaron M Dunwoody
(74) *Attorney, Agent, or Firm* — Whitaker Chalk Swindle & Schwartz PLLC; Charles D. Gunter (57) ABSTRACT

A sealing gasket is shown which is designed to be used in making up a sealed pipe joint in a plastic pipeline conveying fluids, such as a water or sewer pipeline. The sealing gasket is a two-component gasket with an elastomeric component and a plastic component. The elastomeric component is stretched over a portion of the plastic component during assembly. Since the two components of the gasket are not permanently bonded to one another, the gasket can be disassembled, allowing various combination s of seal and retainer designs. The gasket can be removed and replace by another gasket after the initial installation. The hard plastic component can be provided with a gripping structure which acts as a restraint mechanism when the sealing gasket is in use.

6 Claims, 11 Drawing Sheets

SEALING GASKET WITH PLASTIC RETAINER RING FOR PLASTIC PIPELINE SYSTEMS HAVING PRE-FORMED SOCKETS

BACKGROUND OF THE INVENTION

1. Field of the Invention

The present invention relates generally to sealing gaskets and sealing systems used in plastic pipelines in which a male spigot pipe section is installed within a mating female socket pipe section to form a pipe joint and, more specifically, to an improved sealing gasket having a specialized retainer ring, as well as a method of installation.

2. Description of the Prior Art

Fluid sealing systems for plastic, fluid conveying pipes are used in a variety of industries. The pipes used in such systems are typically formed from thermoplastic materials including polyolefins and PVC. In forming a joint between sections of pipe, the spigot or male pipe end is inserted within the female or socket pipe end. An annular, elastomeric ring or gasket is typically seated within a groove formed in the socket end of the thermoplastic pipe. As the spigot is inserted within the socket, the gasket provides the major seal capacity for the joint. Various types of sealing technologies have been employed to assure the sealing integrity of the pipe joint. It is important that the sealing gasket not be dislodged during the joint make up and that the gasket not become twisted or otherwise compromised in field applications. It is also important that the gasket not extrude out of the pipe groove under various pressure conditions.

Earlier gasketed sealing systems are known in which an elastomeric gasket was generally deformable, allowing it to be flexed or bent by hand, accepting inverse curvature, and inserted within a mating internal raceway formed in the female, belled pipe end. The raceway in the female pipe bell end was pre-formed, as by using a collapsible mandrel belling tool at the pipe manufacturing facility. Notable among those systems with pre-formed sockets was the so-called "Anger" joint with its characteristic 30°/60° "triangular" raceway. These first sealing systems were generally applied to PVC-U type plastic pipelines.

The sealing gaskets made for these earlier sealing systems were mostly single durometer, or dual durometer, with some being plastic/rubber retainer (PR) seal rings. The present inventive sealing system is intended to be an alternative to these earlier systems.

After these first generation sealing systems, a new technology was developed in the early 1970's by Gunnar Parmann of Rieber & Son of Bergen, Norway, referred to in the industry as the "Rieber™ Joint." The Rieber™ system employed a combined mold element and sealing ring for sealing a joint between the socket end and spigot end of two cooperating pipes formed from thermoplastic materials. In the Rieber process, the elastomeric gasket was inserted within an 9 internal groove in the socket end of the female pipe as the female or belling end was simultaneously being formed. The provision of a prestressed and anchored elastomeric gasket during the belling process at the pipe factory provided an improved socket end for a pipe joint with a sealing gasket which would not twist or flip or otherwise allow impurities to enter the sealing zones of the joint. These features increased the reliability of the joint and decreased the risk of leaks or possible failure due to abrasion or other factors. The Rieber™ system was very successful commercially and took over most of the market for PVC-U pipe. The Rieber™ process is described in the following issued U.S. Pat. Nos. 4,120,521; 4,061,459; 4,030,872; 3,965,715; 3,929,958; 3,887,992; 3,884,612; and 3,776,682.

In more recent years, plastic pipe systems utilizing PVC-O pipe have become increasingly popular. The PVC-O pipe systems were generally incompatible with the Rieber™ system of pipe belling and, as a result, have brought back the popularity of the "Anger" raceway.

The assignee of the present invention has developed seals for the Anger raceway in the past. See, for example, U.S. Pat. No. 6,044,539, issued Apr. 4, 2000, to Guzowski, and commonly owned by the present Applicant which describes a machine for inserting a "snap-fit" gasket into a preformed gasket receiving groove in a belled pipe end. See, also, U.S. Pat. No. 10,107,427, issued Oct. 23, 2018, to Monteil, and assigned to the present Applicant, which describes a two-component gasket that is designed to be installed in a PVC-O raceway provided within a socket end of a female bell plastic pipe end. The raceway in the female bell plastic pipe end is preformed during manufacture and the gasket is installed thereafter. The gasket has a rubber body portion which is reinforced by a hard plastic band formed as a series of integral, spaced wedges which are interconnected by a flexible ribbon.

Other commercial gaskets available in the industry include the Anger-Lock™ gasket, developed by Trelleborg. The Trelleborg Anger-Lock™ gasket is a combined lip and compression seal gasket which is inserted inside the bell pipe raceway after the raceway has been pre-formed. It is a rubber/plastic design with the plastic region acting as a retaining element to effectively lock the seal ring into the raceway groove. The hard polymer component is intended to act in the same structural manner as the metal component in the original Rieber™ belling operation.

In Applicant's co-pending application Ser. No. 18/337, 212, filed Jun. 19, 2023, entitled "Rieber Sealing System With Plastic Retainer Ring," by the same inventors, a gasket is shown for use in a Rieber™ manufacturing process which overcomes many of the shortcomings of the previously discussed prior art. The concept offers advantages over those "improvement gaskets" to the traditional Rieber™ pipe belling process discussed above, where the traditional steel retainer ring in the gasket is replaced by a hard plastic part. Applicant's design in the co-pending application doesn't require bonding between the plastic and rubber/elastic part of the gasket, so various combinations of elastic and plastic materials can be used. The two parts are molded separately, then assembled, so that the plastic doesn't need to be an expensive high temperature resistant formulation. The two components can be taken apart and reassembled, in case there is a need to exchange plastic or elastic materials. So, both rigid and flexible thermoplastics can be used, which are not restricted to simple polyolefins, or expensive engineering thermoplastics.

Despite the improvements offered by Applicant's co-pending application, it was not intended to be applied to sealing or sealing/restraint systems which are non-Rieber™ systems. That is, those systems where the the raceway in the female, belled plastic pipe end is preformed during manufacture and the gasket is installed thereafter.

The present invention thereby has as a primary object to provide a composite sealing gasket with a softer elastic portion and a harder plastic portion which serves as a reinforced region which helps to ensure that the gasket is not displaced during field installation, storage or transport and which can be used in plastic pipe systems featuring Anger™ type pre-formed sockets.

Another object of the invention is to provide such a gasket design which does not require bonding between the plastic and the elastic portions of the gasket, so various combinations of elastic and plastic materials can be used.

Another object is to provide such a gasket in which the plastic and elastic components are molded separately, and then assembled, so that the plastic component doesn't need to be an expensive, high temperature resistant formulation.

Another object is to provide such a manufacturing method in which the elastomeric component is assembled over at least a portion of the plastic component by stretching the elastomeric portion over the plastic portion.

Another object is to produce such a an improved gasket in which the two components of the gasket can be taken apart and reassembled, in case there is a need to exchange plastic or elastic materials, as where soils are contaminated and the elastic portion needs to be replaced with a more fluid resistant material, such as a more oil and gas resistant elastomer.

Another object is to allow recyclability of the elastic/plastic gasket. Current production plants scrap a percentage of the pipe bells, and the gasket in the pipe belled end is not always removed before recycling the pipe. A metal band or ring containing gasket can severely damage pipe recycling equipment.

Additional objects, features and advantages will be apparent in the written description which follows.

SUMMARY OF THE INVENTION

A two component sealing gasket is shown which represents an improvement over the traditional pipe sealing systems for pipes with preformed raceways. The gasket has a rubber or elastomeric circumferential component and a hard plastic circumferential component. The design doesn't require bonding between the hard plastic and rubber portions of the gasket, so various combinations of elastomeric and plastic materials can be used. The two parts are molded separately, then assembled, so that the plastic doesn't need to be an expensive high temperature resistant formulation. The two components can be taken apart and reassembled, in case there is a need to exchange plastic or elastic materials. So, both rigid and flexible thermoplastics can be used, which are not restricted to simple polyolefins, or expensive engineering thermoplastics. The hard plastic component of the gasket can be provided with ridges or gripping teeth which function as a restraint mechanism in addition to the gasket performing a sealing function when the assembled gasket is installed within the socket region of the female pipe making up the pipe joint. In some circumstances during the assembly, an anchor portion of the elastic component is stretched over at least a portion of the plastic component, with some degree of stretch on the elastic component for stability. For example, in some instances, a 1% stretch is put on the anchor portion of the elastomeric component over the raceway. In other instances, a 0% stretch has been utilized. In either case, a portion of the elastomeric component fits in an external circumferential raceway or channel formed in the plastic component so that the rubber fits snugly in the channel.

More specifically, a two component sealing gasket is shown which is designed to be received in a socket end of a female thermoplastic pipe, the socket end being sized to matingly engage a spigot end of a mating male thermoplastic pipe to form a sealed pipe joint. The two-component sealing gasket comprises:

a leading nose region formed of a hard plastic type material;

a trailing main body region formed of a softer rubber or elastomeric type material;

wherein the differing materials of the two component gasket form an elastic circumferential component and a hard plastic circumferential component, the two components being molded separately and then assembled together by stretching the elastic component over at least a portion of the hard plastic component, prior to installing the sealing gasket within the socket end of the female thermoplastic pipe; and wherein the leading nose region formed of the hard plastic material provides a rigid nose region to resist seal extrusion during joint make-up or under pressurized conditions.

The elastomeric component of the two component gasket can conveniently be formed of a rubber selected from the group consisting of styrene butadiene rubber, EPDM, nitrile rubber, Viton or fluorocarbon, TPE, or TPV. The hard plastic component of the gasket can be formed of a thermoplastic synthetic material such as a material selected from the group consisting of polyethylene, polypropylene, PET, PBT, Polyamide, their glass filled versions, and recycled versions.

The elastomeric component of the sealing gasket has an outer circumferential region which forms a seal with the groove provided in the female thermoplastic pipe and a downwardly extending lip region which forms a seal with the mating male thermoplastic pipe. The hard plastic component of the gasket has an outer circumferential surface which aligns with the outer circumferential region of the elastic component after assembly in the socket end of the female plastic pipe and wherein the hard plastic component of the gasket has a trailing external raceway which circumscribes the plastic component. The elastomeric component has an elastic anchor region which is received in the trailing external raceway of the hard plastic component, whereby the elastic anchor region fits snugly in the raceway after assembly.

The hard plastic component can be provided with at least one gripping structure formed on a selected exterior and/or interior circumferential surface thereof to thereby make a restrained joint when assembled in the socket end of the female thermoplastic pipe. The gripping structure can conveniently comprise either a ridge or ridges, or at least one row of gripping teeth.

Additional objects, features and advantages will be apparent in the written description which follows.

DETAILED DESCRIPTION OF THE INVENTION

The present invention provides a sealing and/or restraint system for plastic pipe joints which meets the foregoing described objectives. The invention described herein and the various features and advantageous details thereof are explained more fully with reference to the non-limiting examples which are illustrated in the accompanying drawing and detailed in the following description. Descriptions of well-known components and processes and manufacturing techniques are omitted so as to not unnecessarily obscure the workings of the invention. The examples used herein are intended merely to facilitate an understanding of ways in which the invention herein may be practiced and to further enable those of skill in the art to practice the invention. Accordingly, the examples should not be construed as limiting the scope of the claimed invention.

The sealing gaskets of the invention are especially well adapted to be substituted for the prior art gaskets used in "Anger" joints of the type used in PVC-O plastic pipe systems. As has been explained, the PVC-O pipe systems have typically been provided with pre-formed internal raceways in the belled, female pipe ends which receive the sealing gaskets, the gaskets forming a seal with the mating, spigot pipe ends during make-up of the joints of a plastic pipeline.

Figure 1:
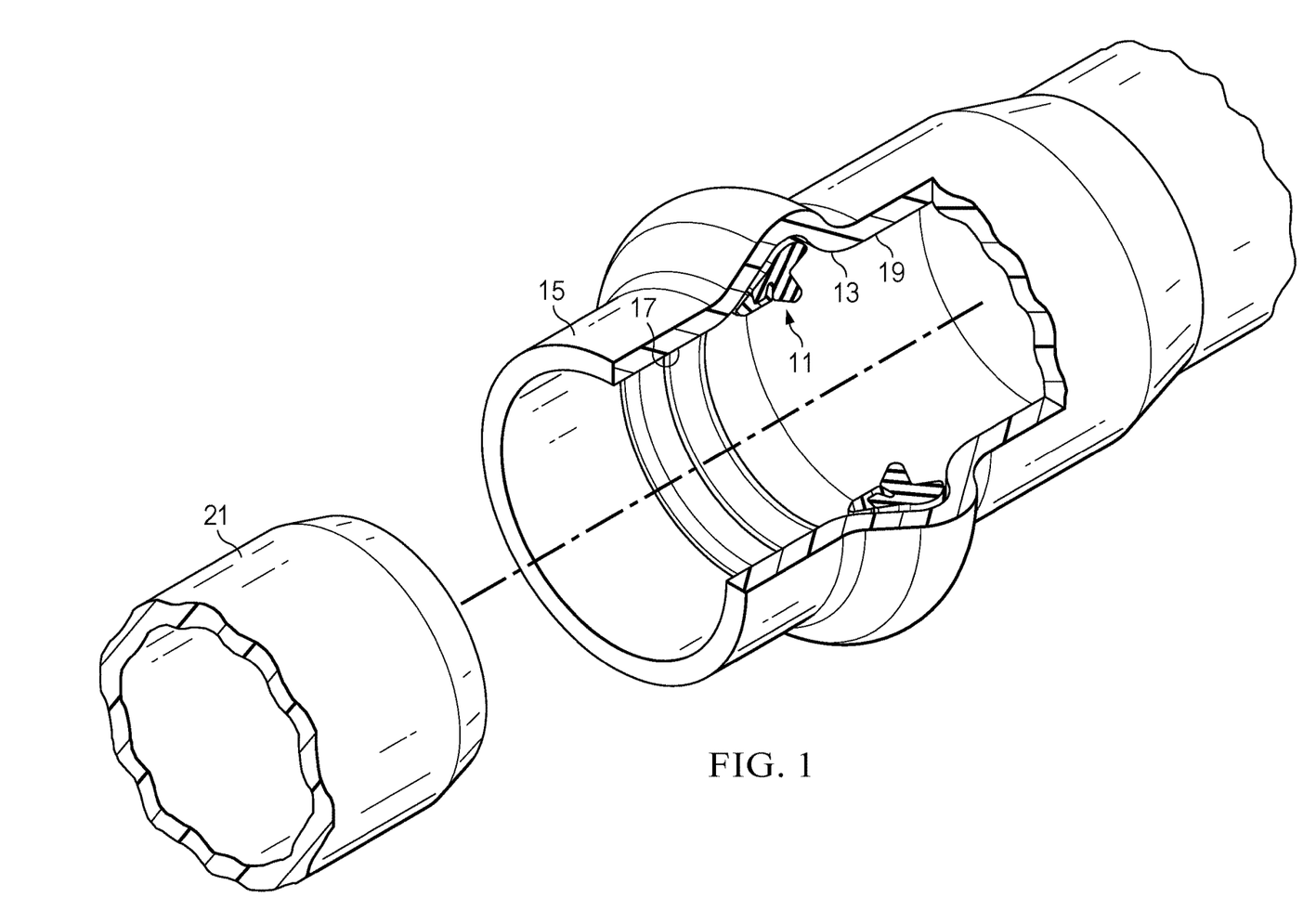
FIG. 1 is a perspective view, partly broken away, of the assembly of a plastic pipe joint where the male spigot pipe end is about to be inserted into the mating female, belled pipe end, the pipe gasket of the invention being shown in an internal groove or raceway formed in the interior of the belled pipe end.

FIG. 1 shows a sealing gasket of the invention, designated generally as 11 which is installed within a groove or raceway 13 provided within the socket end 15 of the illustrated thermoplastic pipe. The internal annular groove 13 of the socket end 15 is located between internal cylindrical surfaces 17, 19, of substantially equal diameter. The socket end 15 is intended to be made-up to form a pipe joint with the mating male or spigot thermoplastic pipe section 21 which is inserted within the socket end 15. The thermoplastic pipe will typically be one of those traditionally used in the 24 waterworks industry, such as a polyvinylchloride, such as PVC-U, PVC-O, etc., Most preferably, the thermoplastic pipe will be part of a PVC-O plastic piping system, such as those used in the 26 waterworks industries for water and sewer pipe.

Figure 2:
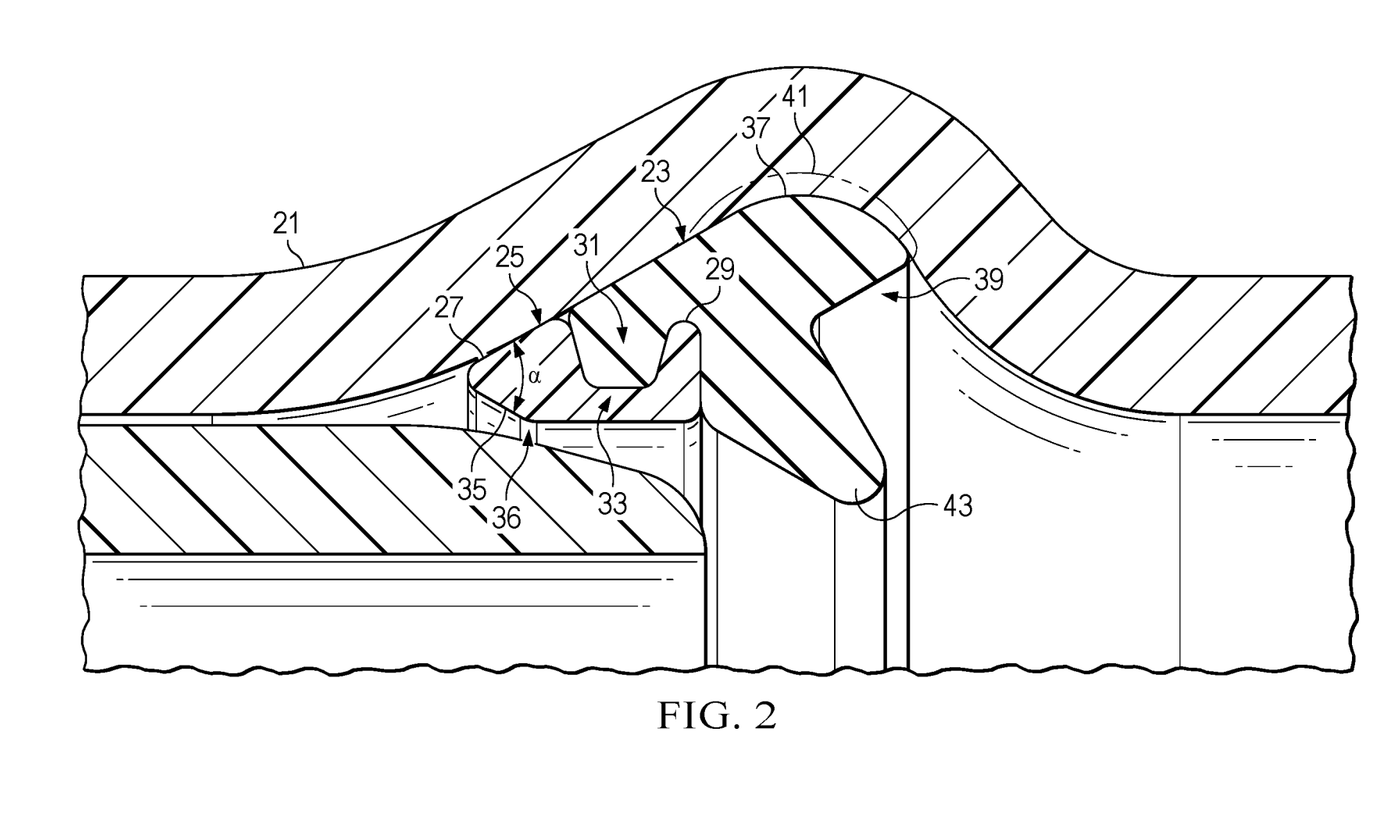
FIG. 2 is a side, partial sectional view of the new gasket of the invention in place in the female, belled pipe end just prior to assembly with the mating male pipe end about to make contact with 9 the hard plastic leading nose region of the gasket.

A particularly preferred form of the first version of the gasket 11 is shown in profile in FIG. 1 and in cross-section in FIG. 2. As best seen in FIG. 2, the gasket 11 is a two-component annular, ring-shaped member having a main gasket body, or first component, 23 formed of a flexible elastomeric material, such as a suitable natural or synthetic rubber, or synthetic elastic, or TPV or TPE. The elastomeric material used to form the body 23 of the gasket will vary in composition depending upon the end application but may encompass a number of different natural and synthetic rubbers including, for example, styrene butadiene rubber (SBR), ethylene propylene diene rubber (EPDM), acrylonitrile-butadiene rubber (NBR), other nitrile rubbers, VITON or other chemical resistant material, as well as TPE's or TPV's etc., The durometer of the elastomer used for the main gasket body may vary depending on the end application but will typically be in the range from about 40-70 Shore A hardness, preferably about 45-60 Shore A.

As can be seen in FIG. 2, the gasket 11 also has a second component 25 which is formed of a synthetic relatively hard plastic type material having a durometer which is greater than the durometer of the main body 55 portion of the gasket. The band can have a higher durometer than the remaining main body portion of the gasket since it does not participate in the sealing function of the gasket to the same extent as the primary sealing region of the gasket. For reasons which will be explained, the relatively hard plastic component 25 of the gasket is not required to have a melting temperature high enough to withstand the temperatures of the gasket molding process 17 (higher than the melting point of the rubber body portion). As a result, it can be a less expensive formulation.

Various hard plastic type materials may be suitable candidates for use as the hard plastic band. These materials include such materials as the polyolefins such as polyethylene, polypropylene and other common plastics, such as polyvinylchloride, PET, PBT, polyamide, their glass filled version or recycled version of such common thermoplastics. It is not generally necessary to use a more exotic material, such as one of the various "engineered plastics," for example, the modified polyphenylene ethers (PPE), Polysulphones or Poly ethyl ether ketones (PEEK) and the like. These commercially available materials have high heat resistance, making them suitable for injection or compression molding temperatures and are generally suitable for plastic/rubber composites.

Although a relatively stiff plastic retainer is advantageous to retain the seal in place, the candidate material for the hard plastic portion of the gasket also needs to be relatively flexible, so that it can be bent for installation without breaking. Based upon recent prototype work, a preferred plastic would have no glass fiber, or a relatively low percentage of glass fiber. This would produce an elastic modulus in the range from, for example, about 900 to 1400 MPa flex modulus without glass fiber. The elongation would also likely be 25% or greater.

In the preferred process of manufacture of the invention, the rubber portion 23 and hard plastic portion 25 of the gasket are separately molded and then later joined together to form an assembled 9 gasket. As a result, a less expensive plastic material can be used for the plastic component 25 of the gasket. While not intended to be limiting in any sense, the following are characteristics of one set of actual materials used in forming a prototype gasket of the invention:

Generic 50 Shore A elastomeric material for the rubber/elastomeric component 23:
  Relatively soft material recommended for non-pressure applications
  Modeled as hyperelastic
  More compatible with relatively low modulus of the plastic portion 57

Density $\rho=1.1$ g/cm$^3$

Neo-Hooke modulus $C_{10}=0.426$ MPa

Compressibility $D1=0.002$ mm$^2$/N

Non-Glass Reinforced Polypropylene for the hard plastic component 25:

Modeled as linear elastic

Elastic modulus $E=900-1400$ MPa

Tensile Elongation (break) $\varepsilon_u=25.0\%$ or greater

With reference again to FIG. 2, the sealing gasket of the invention can be seen to be a ring shaped composite elastomeric body which, when viewed in cross section, has a leading region formed of the relatively hard plastic material 25 and which has a trailing region 23 which is formed of the relatively softer rubber or elastomeric type material. The harder leading region has an outer circumferential surface 27 which aligns with the outer circumferential region of the elastic component 23 after assembly in the socket end of the female plastic pipe. The hard plastic component of the gasket also has a trailing external raceway 33, defined in part by an outer wall region 29, which circumscribes the plastic component and which receives a portion 31 of the elastomeric component when the elastomeric and hard plastic components are assembled to form the sealing gasket.

With further reference to FIG. 2, the portion 31 of the elastomeric component which is received in the trailing external raceway 33 acts as a kind of elastic "anchor region" with the anchor region fitting snugly in the external raceway 33. In some instances, the anchor region may be squeezed laterally in the raceway after assembly. This causes lateral interference or compression of the elastic anchor region 31 thereby contributing to resisting seal extrusion. The lateral interference might need to be increased to improve stability, depending upon the application, e.g., whether the joint in question is a low pressure joint or relatively high pressure joint. However, in current configurations, it has not been found necessary to have such lateral interference in the raceway. Little or no lateral interference may be sufficient. For example, in some prototypes, a 1% stretch on the anchor region over the raceway has been used. In other prototypes, 0% stretch has been employed. In other words, the rubber is stretched over the retainer to approach its intended OD, as opposed to having its intended OD while unstretched. The external raceway channel 33 might also be modified to produce a snap-fit effect with the elastic anchor region.

The leading nose region formed of the hard plastic material provides a rigid nose region which acts to resist seal extrusion during joint make-up or under pressurized conditions. In addition to the outer circumferential region of the hard plastic component, this component of the gasket also has an inner circumferential surface (35 in FIG. 2) which extends at an acute angle "a" from the outer circumferential surface 25 to thereby form a smooth inner angled surface that aids in guiding the male pipe spigot end 21 during assembly of the pipe joint. The angled surfaces, as seen in FIG. 2, form an "arrow shaped" leading nose region, when viewed in cross section. The hard, smooth inner surface of the hard plastic component is provided with a small clearance 36 between the surface 35 and the exterior surface of the spigot pipe end which helps to guide the spigot end during joint make-up. The hard plastic component is located away from the main seal body where the main sealing action takes place.

The location of the hard plastic region with its leading nose region, as described above, causes the hard plastic nose region to have a much more decisive participation in blocking seal blow-out than previous plastic/rubber/retainer gasket systems known in the prior art, due to the shape of the nose of the hard plastic ring and its and location at the front of the seal ring. The shape of the nose of the gasket and the "small clearance" referred to above also have a significant effect during joint assembly. As the male, spigot pipe end is pushed in during assembly, the base of the lip of the seal is separated from the rear wall of the plastic retainer. This extra flexibility yields a very low assembly force compared to prior art seals of similar size. However, when internal pressure is applied to the pipeline, the seal lip returns to come into contact with the hard plastic ring and is supported by the hard plastic ring, so tht the extra flexibility and low assembly force do not have the secondary effect of reducing sealing performance.

The elastomeric component of the gasket can be seen in FIG. 2 to form a smooth bulbous region which continues around the gasket body to an indented region 39 forming two lobes 41, 43, of 19 the softer, elastic type material. The lower lobe 43 provides the primary sealing function with the male spigot pipe end, acting in the nature of a "lip seal" with the upper lobe acting in the nature of a compression seal. As has been explained, the elastomeric component of the sealing gasket is stretch-fit over the hard plastic component without bonding or gluing, during assembly. This allows the elastomeric and hard plastic components of the sealing gasket to be taken apart after assembly, thereby allowing the substitution of gasket components formed of different materials. The seal can be adjusted, for example, for more or less radial interference, compression, thicker or thinner lips, ribs, etc., according to customer preference.

Figure 3:
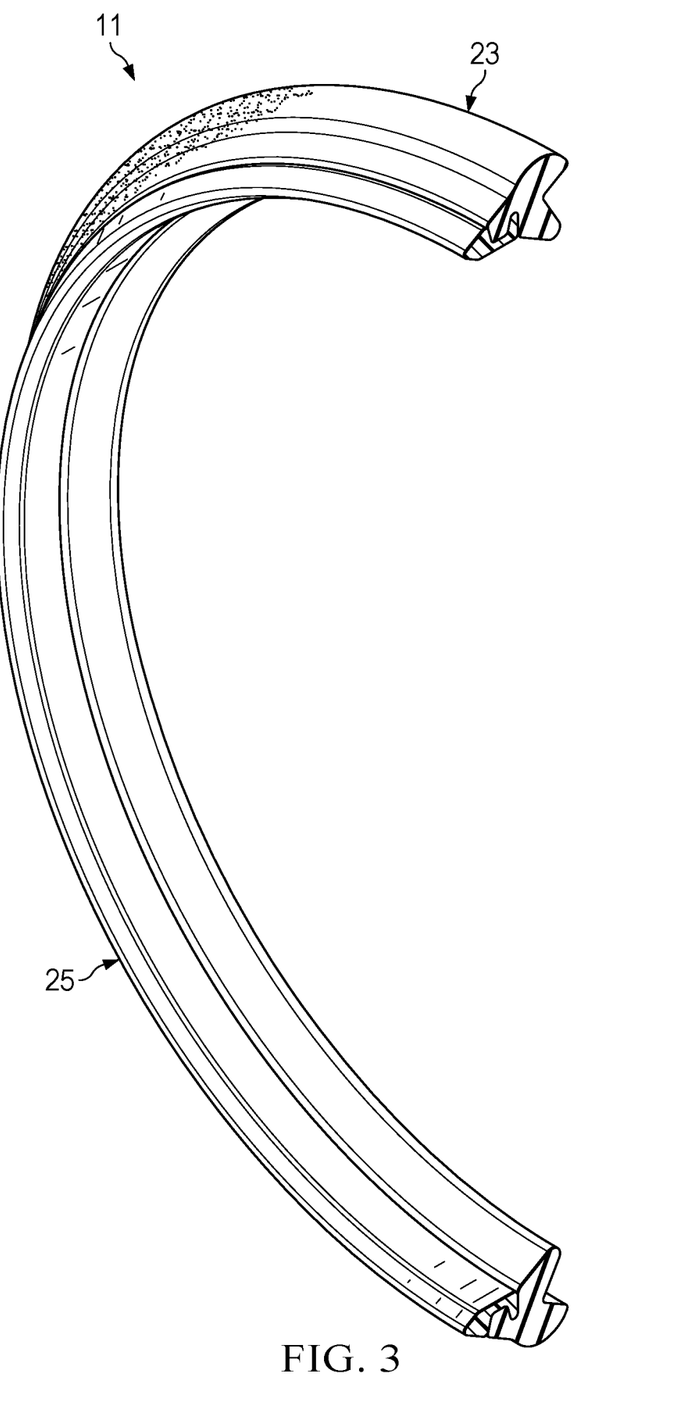
FIG. 3 is a partial perspective view of the sealing gasket of the invention in a first form.
Figure 4:
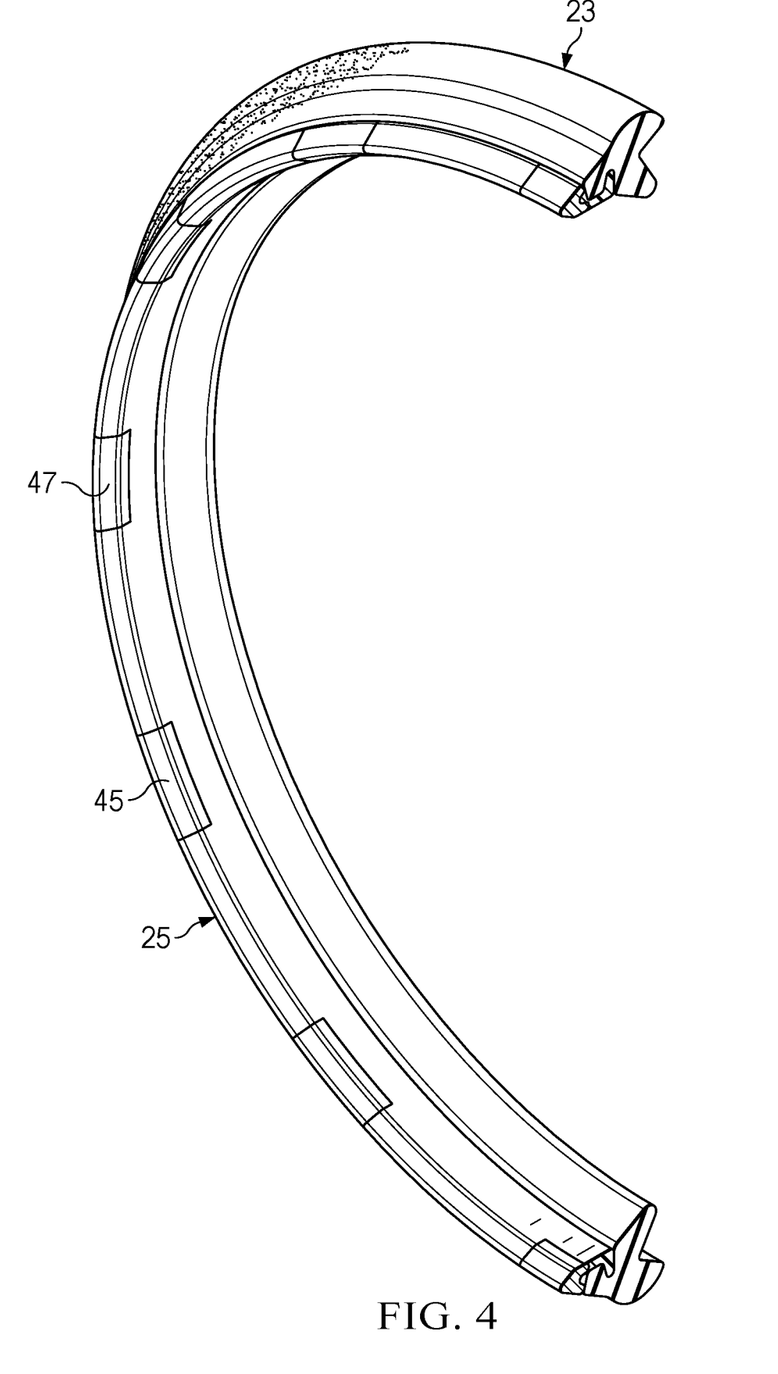
FIG. 4 is a partial perspective view of one version of the gasket of the invention similar to FIG. 3, but in which the hard plastic component of the gasket is provided with a series of smooth spaced segments or inserts to provide additional resistance to seal blow out without indenting the male spigot pipe end.

FIG. 3 is a partial perspective view of a first form of the gasket of the invention illustrating the relatively hard plastic component 25 and the relatively softer elastomeric component 23 thereof. FIG. 4 shows another form of the gasket of the invention in which the hard plastic component 25 has smooth rigid inserts, e.g., 45, 47 in FIG. 4. These inserts would typically be formed of metal or fiber reinforced fabric and be either straight or curved. Inserts of this type would provide additional resistance to seal blow-out without indenting the socket or spigot. This would allow using a relatively softer and more flexible plastic component for easier installation. The inserts may conveniently be embedded (overmolded) in the plastic or might be snap-fit into position.

Figure 5:
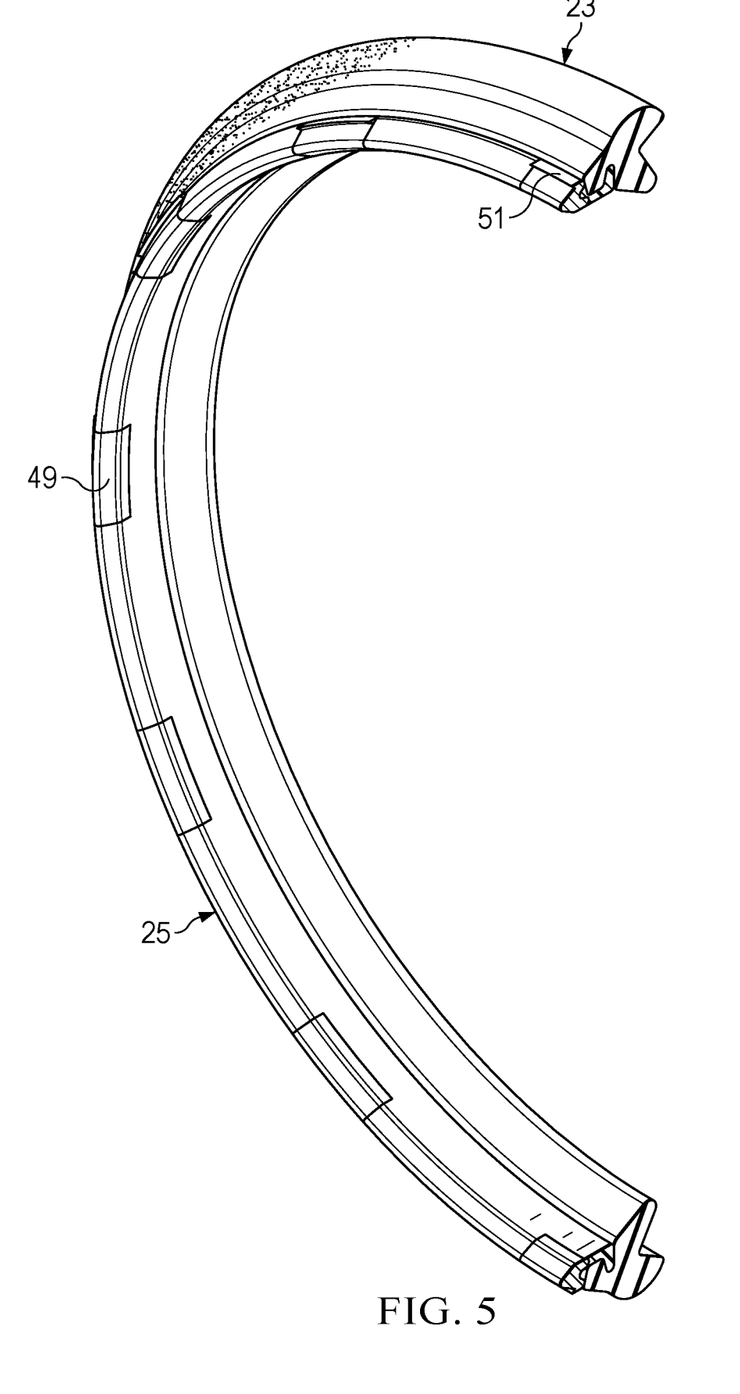
FIG. 5 is a view similar to FIG. 4 but showing spaced segments having ridges or teeth formed on the socket side to provide enhanced resistance to seal blow out as they indent into the socket.
Figure 6:
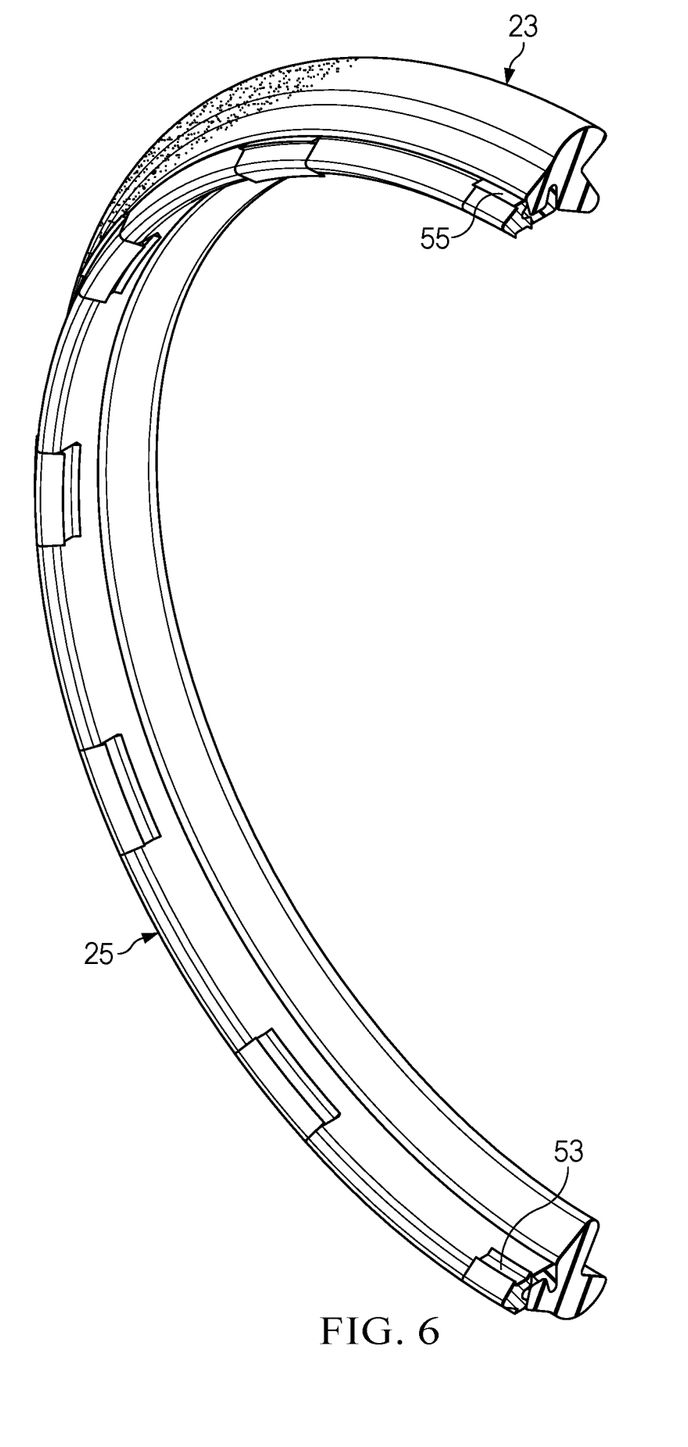
FIG. 6 is a view similar to FIG. 5, but where the spaced segments have ridges or teeth on both the socket and spigot sides to provide joint restraint capability.

In some applications it may be advantageous for the gasket of the invention to have a restraint feature, as well as a sealing capability. In such a design, the hard plastic component has at least one gripping structure formed on an exterior and/or interior circumferential surface thereof to thereby make a restrained joint when assembled in the socket end of the female thermoplastic pipe. FIGS. 5 and 6 show two additional forms of the gasket of the invention in which the gasket is provided with such a restraint feature, in addition to the sealing aspect of the gasket. In FIG. 5, the hard plastic component 25 is provided with hard segments 49 which have a ridge or tooth 51 on the socket side which would provide enhanced resistance against seal blow-out as they indent the socket and cling onto the socket.

Figure 7:
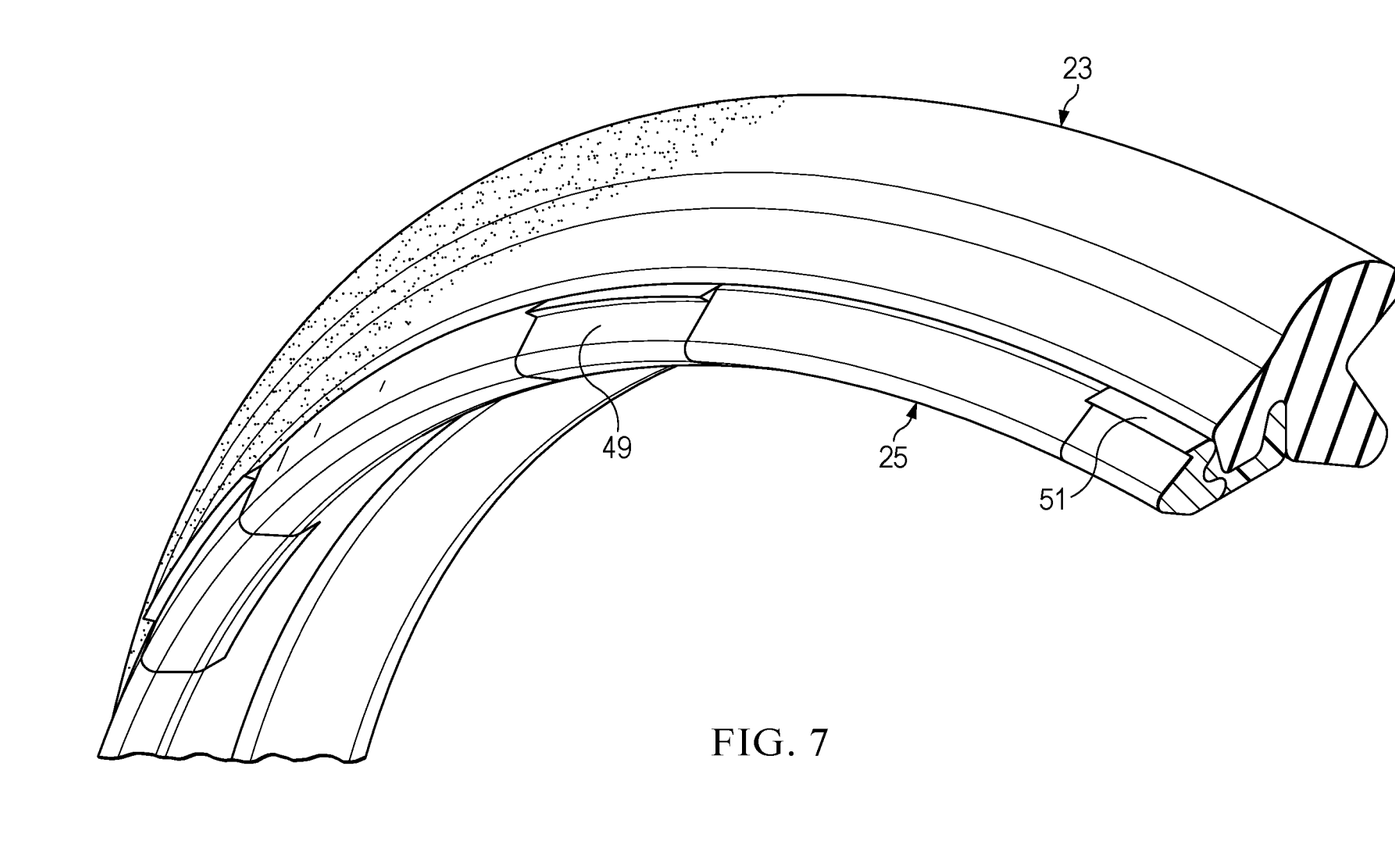
FIGS. 7 and 8 are partial, close up views of the versions of the sealing gasket shown in FIGS. 5 and 6, respectively.
Figure 8:
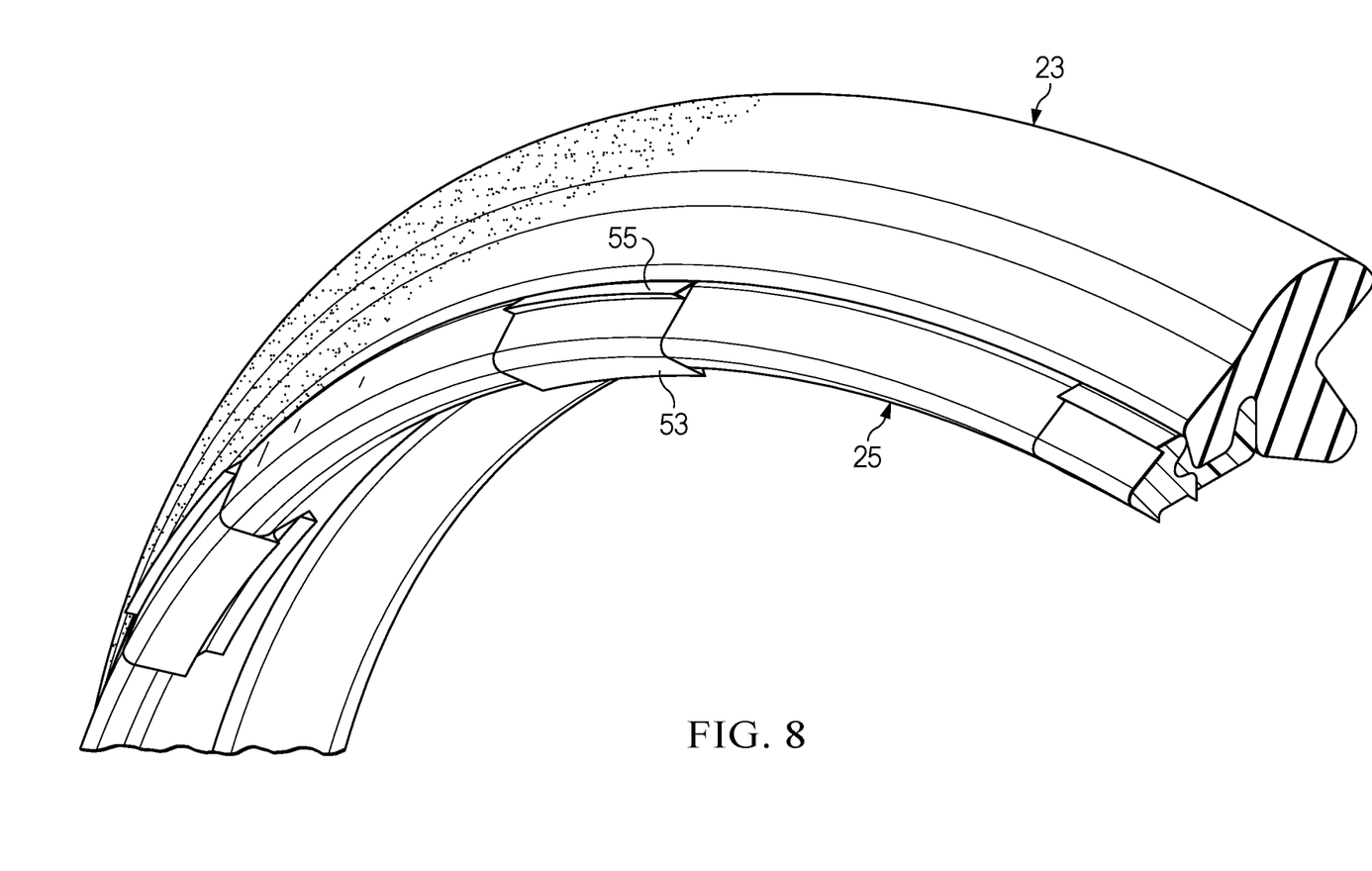

In the version of the gasket shown in FIG. 6, segments with ridges or teeth are provided on both the spigot side 53 and on the socket side 55 of the hard plastic component 25 to provide an 19 enhanced restraint effect. Since it is comparatively easier to overmold plastic than rubber on the inserts, due mostly to a lower molding pressure, this could result in a cost advantage over restraining seal systems in which the segments are embedded in the rubber. FIGS. 7 and 8 are close up views of the versions of the gasket shown in FIGS. 5 and 6.

Figure 9:
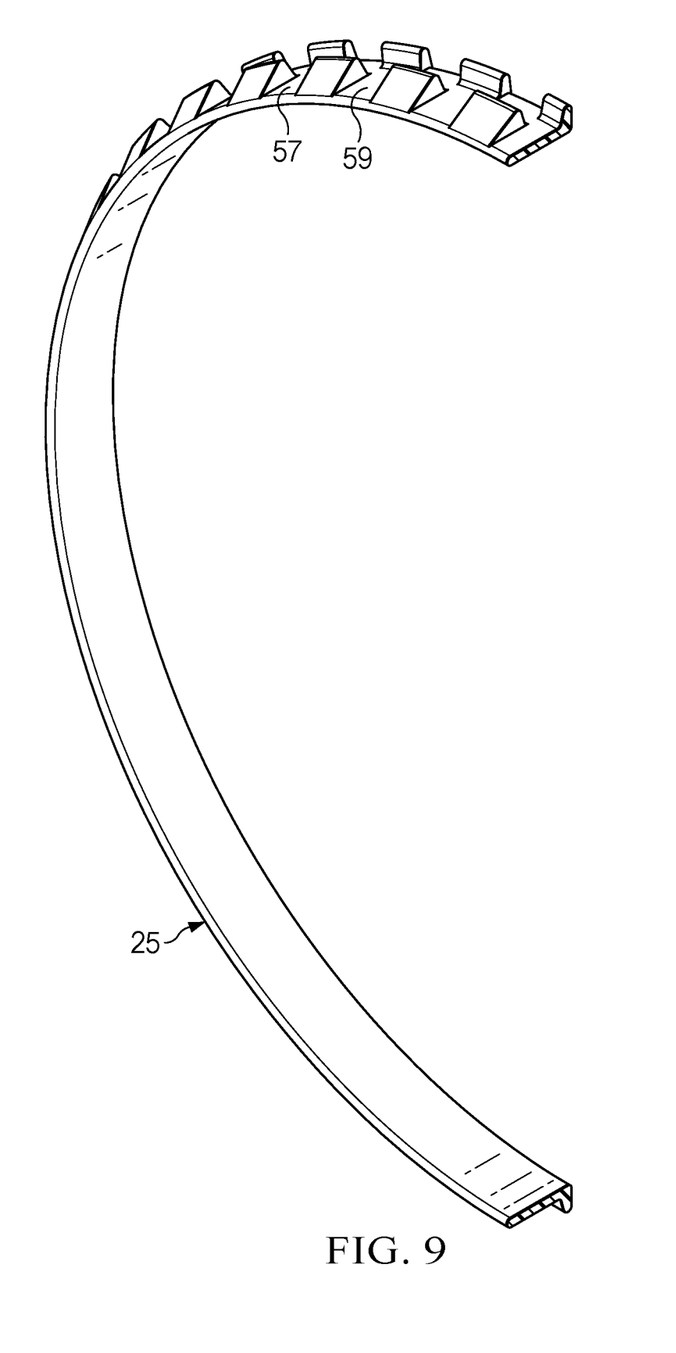
FIGS. 9-11 show a further version of the gasket of the invention in which the hard plastic component is formed with segmented channels, allowing the possibility of injection molding of the hard plastic retainer ring with a two-part mold.
Figure 10:
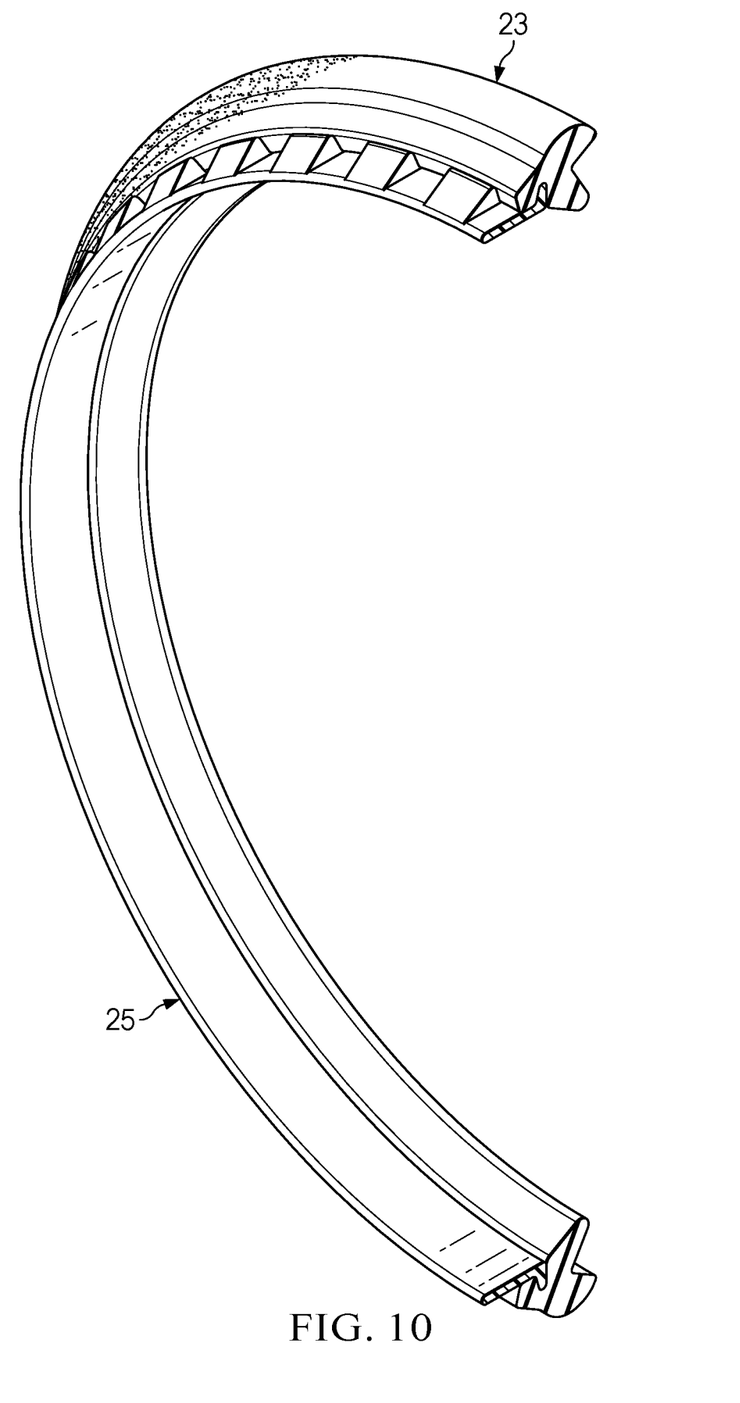
Figure 11:
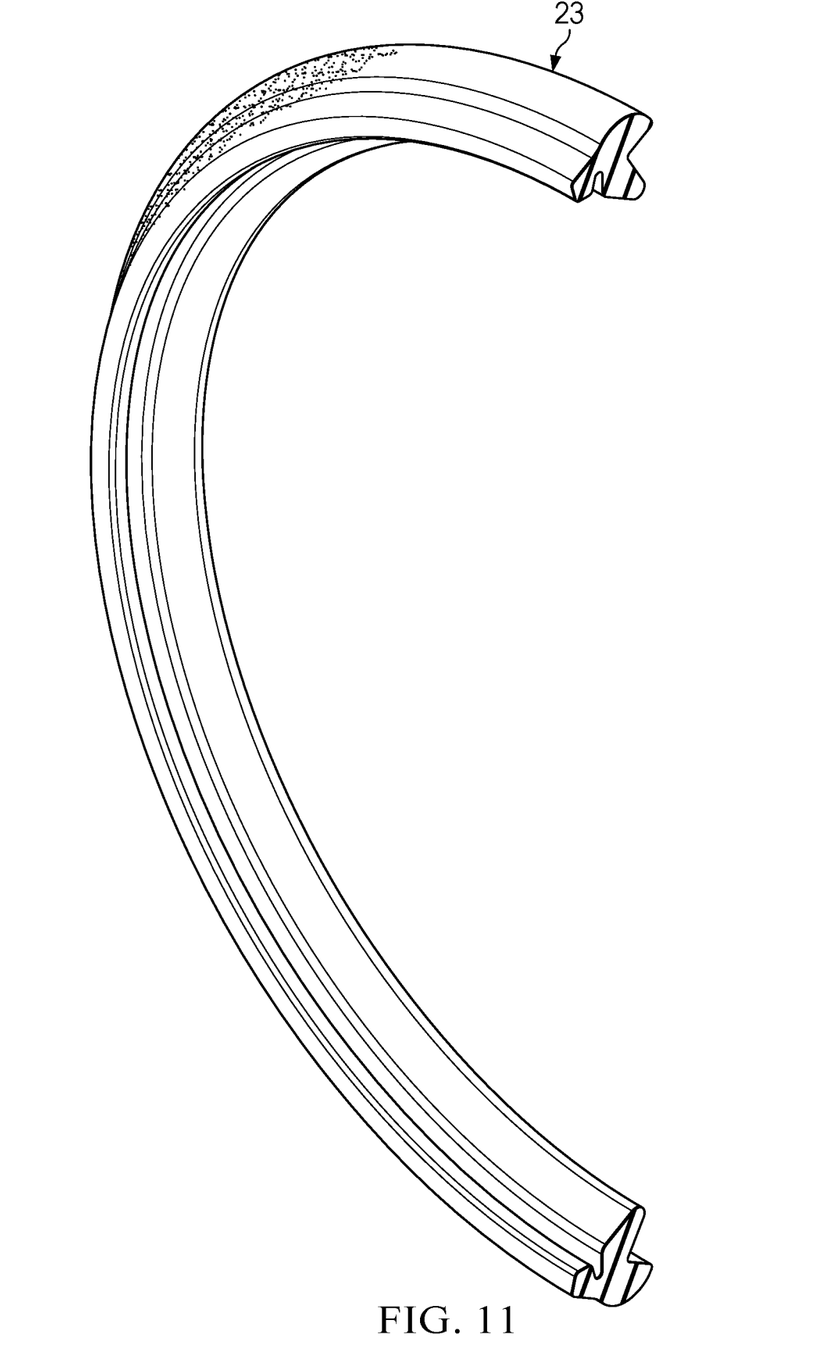

FIGS. 9-11 show a further version of the gasket of the invention in which the hard plastic component 25 is formed with segmented channels, e.g., channels 57, 59. This would allow the possibility of injection molding of the hard plastic retainer ring with a two-part mold. The design with a continuous channel requires extra mold parts opening sideways. As shown in FIG. 9, the discontinuity in the front side of the plastic band enables the mold to form the rear wall. Likewise, the discontinuity in the rear wall enables the mold to form the front part. The slots in the softer rubber component, e.g., 61, 63 in FIG. 11, mate with the discontinuous rear walls in the plastic retainer ring.

The gasket can be installed in the female, belled pipe end raceway in conventional fashion. For example:

Forming the gasket into an oval shape and sliding the slanted gasket into the female belled pipe end, past the raceway, followed by pushing one side into the raceway and pulling the remainder back until it falls into the raceway; or Buckling the gasket, pushing the side opposite to the buckle into the raceway, and free/guiding the seal to snap back into the original shape once inside the raceway.

An invention has been provided with several advantages. While prior art two component gaskets have been used in the past, the present gasket has two dissimilar portions which can be permanently or semi-permanently joined, preferably without bonding, gluing with an adhesive, etc. Rather, in the most preferred form, the two component gasket of the invention has discrete components which are molded separately and then assembled together, as by stretching the elastic portion of the gasket over a region of the plastic portion. While the components are preferably injection molded, it is also possible that the rubber component could be extruded with the ends being subsequently joined, in some circumstances. The gasket is removable after installation in the 19 raceway of the female belled pipe end. For example, it might be convenient to replace a more common rubber component of the gasket with a gas and oil resistant rubber formulation in some circumstances of use.

The use of two discrete gasket components allows the use of less exotic plastic materials and saves costs. The plastic component and Rubber or TPE/TPV components allow separation of the two essential parts of the gasket with concomitant replaceability of the elastic component and recyclability, and are not limited to adhesively compatible materials. Unlike normal bonded olefin-EPDM elastomer or TPV/TPE gaskets, the two components due to the unique design characteristics, do not need to be adhesively compatible.

The use of a sealing gasket with a plastic retainer, rather than using steel, avoids leaving metal parts in the ground over time. Because the parts are held together by a stretch-fit, compatibility of various plastic and elastomeric formulations for bonding purposes is not necessary. Mechanical interlocking is also not required, as in over-molding techniques where rubber is flowed through opening in the plastic part during manufacture.

The new design exhibits a dramatic increase in plastic volume compared to other presently used seal designs. The less expensive plastic can be, for example, a polypropylene, PET, Polyamide, or recycled version of any plastic with little or no glass fiber. The material selection is intended to achieve around a 900-1400 MPa flex modulus while avoiding brittle behavior. The design also consequently exhibits a dramatic reduction in the elastomer volume as compared to other seals of this general type. The volume of elastomer used is significantly lower than current sewer sealing gaskets with steel ring retainers.

While the invention has been shown in several of its forms, it is not thus limited but is susceptible to various changes and modifications without departing from the spirit thereof, as described in the claims which follow.

What is claimed is:

1. In combination, a two component sealing gasket and a female thermoplastic pipe, the combination comprising:
   a two component sealing gasket having a leading nose region formed of a hard plastic material;
   the two component sealing gasket having a trailing main body region formed of a softer elastomeric type material;
   wherein the two component sealing gasket is installed in a socket end of the female thermoplastic pipe, the socket end being sized to matingly engage a spigot end of a mating male thermoplastic pipe to form a sealed pipe joint, and wherein the differing materials of the two component gasket form an elastomeric circumferential component and a hard plastic circumferential component, the two components being molded separately and then assembled together by stretching the elastomeric component over at least a portion of the hard plastic component, prior to installing the sealing gasket within the socket end of the female thermoplastic pipe;
   wherein the leading nose region of the two component sealing gasket formed of the hard plastic material provides a rigid nose region to resist seal extrusion during joint make-up or under pressurized conditions;
   wherein the hard plastic component of the two component gasket has at least one gripping structure formed on an exterior and/or interior circumferential surface thereof to thereby make a restrained joint when assembled in the socket end of the female thermoplastic pipe;
   wherein the gripping structure is comprised of at least one row of gripping teeth formed on the interior circumferential surface; and
   wherein the gripping teeth are formed on both the exterior and the interior circumferential region of the hard plastic component.

2. In combination, a two component sealing gasket and a female thermoplastic pipe, the combination comprising:
   a two component sealing gasket having a leading nose region formed of a hard plastic material;
   the two component sealing gasket having a trailing main body region formed of a softer elastomeric type material;
   wherein the two component sealing gasket is installed in a socket end of the female, thermoplastic pipe, the socket end being sized to matingly engage a spigot end of a mating male thermoplastic pipe to form a sealed pipe joint, and wherein the differing materials of the two component gasket form an elastomeric circumferential component and a hard plastic circumferential component, the two components being molded separately and then assembled together by stretching the elastomeric component over at least a portion of the hard plastic component, prior to installing the sealing gasket within the socket end of the female thermoplastic pipe;
   wherein two component sealing gasket has an elastomeric circumferential component formed of an elastomeric material having a hardness in the range from about 40-60 Shore A and a hard plastic circumferential component formed of a higher hardness material selected from the group consisting of synthetic plastics and their glass filled or recycled forms, the two components of the gasket being molded separately and then assembled together by stretching the elastomeric component over at least a portion of the hard plastic component, prior to installing the two component sealing gasket within the socket of the female thermoplastic pipe;

wherein the leading nose region of the two component sealing gasket formed of the hard plastic material provides a rigid nose region to resist seal extrusion during joint make-up or under pressurized conditions, wherein the hard plastic component of the gasket has an outer circumferential surface which aligns with the outer circumferential region of the elastic component after assembly in the socket end of the female plastic pipe and wherein the hard plastic component of the gasket has a trailing external raceway which circumscribes the plastic component and which receives a portion of the elastomeric component when the elastomeric and hard plastic components are assembled to form the two component sealing gasket; and wherein the hard plastic component of the two component sealing gasket has an arrow shaped leading nose region, when viewed in cross section, the nose region being formed between an outer circumferential surface which aligns with the outer circumferential region of the elastomeric component and an inner circumferential surface which extends at an acute angle from the outer circumferential surface to thereby form a smooth inner angled surface that aids in guiding the male pipe spigot end during assembly of the pipe joint.

3. The combination of two component sealing gasket and female thermoplastic pipe of claim 2, wherein the elastomeric component has an elastic anchor region which is received in the trailing external raceway which is formed in the hard plastic component, the elastic anchor region fitting snugly in the raceway after assembly, thereby contributing to resisting seal extrusion.

4. The combination of two component sealing gasket and female thermoplastic pipe of claim 2, wherein the hard plastic component has at least one gripping structure formed on an exterior and/or interior circumferential surface thereof to thereby make a restrained joint when assembled in the socket end of the female thermoplastic pipe.

5. The combination of two component sealing gasket and female thermoplastic pipe of claim 4, wherein the gripping structure is comprised of at least one row of ridges or gripping teeth formed on the interior circumferential surface.

6. The combination of two component sealing gasket and female thermoplastic pipe of claim 4, wherein the ridges or gripping teeth are formed on both the exterior and the interior circumferential region of the hard plastic component.

* * * * *